No. 809,099. PATENTED JAN. 2, 1906.
H. DESRUMAUX.
FILTERING, PURIFYING, AND DECANTING APPARATUS.
APPLICATION FILED APR. 5, 1905.
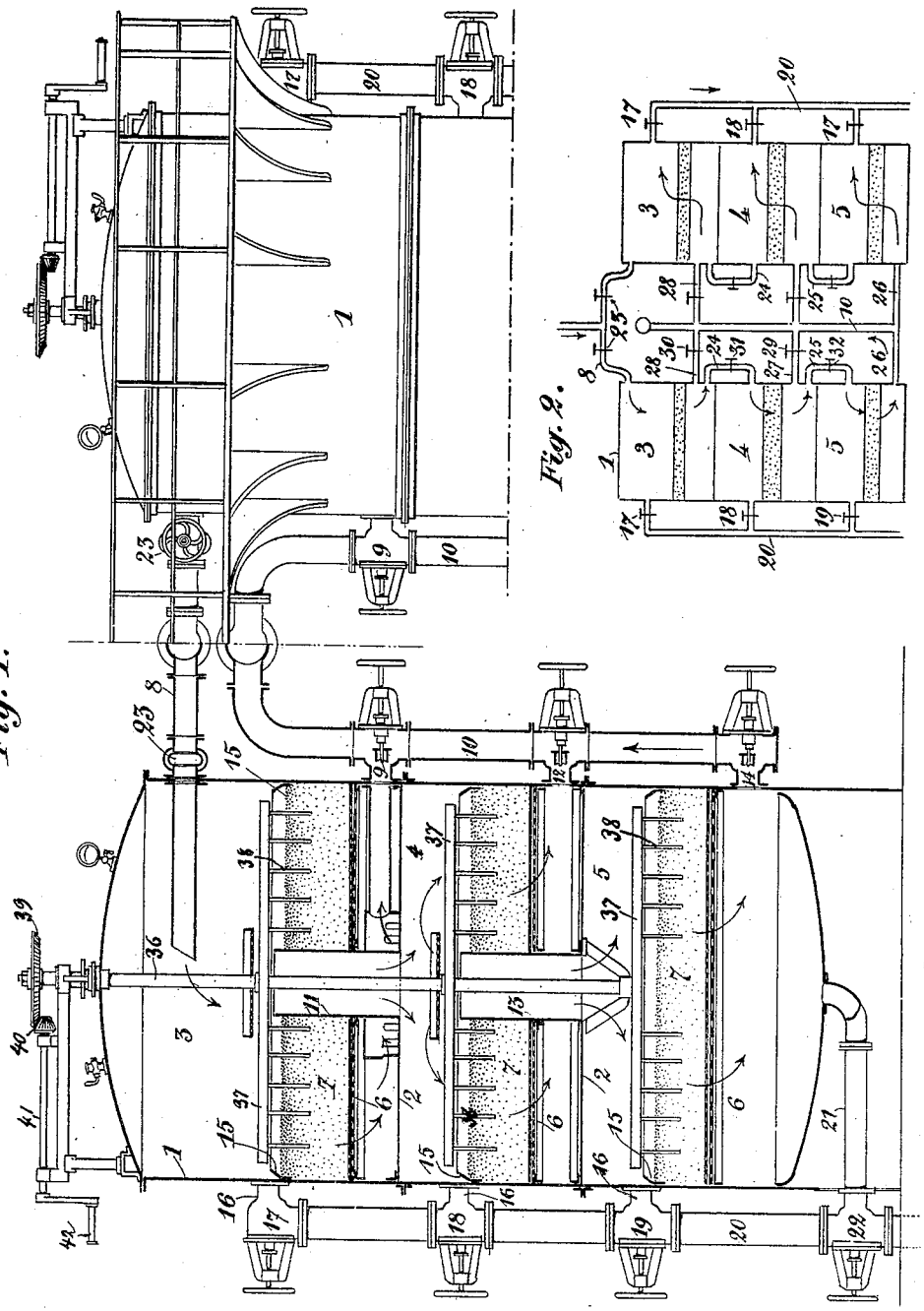
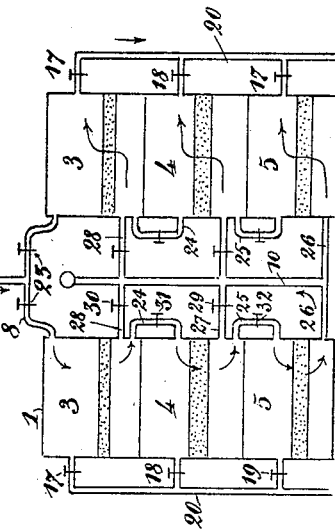

UNITED STATES PATENT OFFICE.

HENRI DESRUMAUX, OF PARIS, FRANCE.

FILTERING, PURIFYING, AND DECANTING APPARATUS.

No. 809,099.      Specification of Letters Patent.      Patented Jan. 2, 1906.

Application filed April 5, 1905. Serial No. 253,986.

*To all whom it may concern:*

Be it known that I, HENRI DESRUMAUX, a citizen of the Republic of France, residing at Paris, France, have invented certain new and useful Improvements in Filtering, Purifying, and Decanting Apparatus, of which the following is a full, clear, and exact specification.

The present invention relates to double filters which may operate separately or simultaneously and which admit of a backward flow of the water in order to clean the filtering strata, as will be hereinafter more fully described.

In the accompanying drawings, forming part of this specification, Figure 1 shows a double filter, half in vertical section and half in elevation. Fig. 2 shows a diagram, at a smaller scale, of another construction of the same filter.

Each half of the filter shown in Fig. 1 comprises a closed vessel 1, divided by partitions 2 into several superposed chambers 3 4 5. Within each chamber is arranged a perforated bottom or grate 6, supporting a layer of suitable filtering material 7.

The water to be filtered is supplied to the upper chamber 3 with more or less pressure through a pipe 8. Part of such water flows through the filtering layer 7 of the chamber 3 and after filtration accumulates in the compartment 6 and flows out through a valve 9 into a pipe 10, leading either to a reservoir or to any water-supply pipe. The other part of the water arriving in chamber 3 flows through a central pipe 11 into the next chamber 4 below. Here again part of the water is filtered and flows out through a valve 12 into the pipe 10, while the excess of water in chamber 4 passes through a pipe 13 into the lowest chamber 5, wherefrom after traversing the filtering strata 7 it goes through a valve 14 into the pipe 10.

To the inner wall of each chamber is secured a ring 15 a little above the filtering layer, forming an annular channel into which opens a discharge branch pipe 16, provided with valves 17, 18, or 19, such branch pipes being connected through these valves with a main discharge-pipe 20, into which opens also a pipe 21, provided with a valve 22, starting from the bottom of the lower chamber.

When it is desired to clean the chambers of one or the other reservoir 1, the water-inlet of the latter is closed by means of a valve 23 of the pipe 8 and the valves 17 18 19 are opened. The filtered water accumulated in the reservoir is now exposed to pressure by any suitable means, and thus is compelled to flow backward, while a supply of water under pressure is admitted through the pipe 10 and the valves 9 12 14. The water rises through the filtering layers, whereupon it escapes, carrying along all the impurities, through the pipes 16 and valves 17 18 19 and the pipe 20. While the water is pressed back through the filtering strata the material of the same is preferably stirred up in order to facilitate the expulsion of the accumulating impurities.

The stirring device consists of a vertical shaft 36, carrying horizontal bars 37 with depending fingers 38. Any number of bars 37 may be employed, and they are secured to the shaft 36 close to the upper edge of the overflow-pipes 11 13, the fingers 38 reaching down into the filtering material as far as possible. A bevel-wheel 39 is keyed upon the upper end of the shaft 36, and the same meshes into a corresponding beveled pinion 40 at the end of a horizontal driving-shaft 41, which may be turned by a crank 42 or by any other suitable means. This stirring device can be used while the filter is working, and the filtering process is greatly facilitated when the filtering layers are made more accessible to the liquids by being stirred up. The cleaning having been carried on for a sufficiently long time, the valves 17 18 19 are closed and valve 23 is opened again in order to set the filter into normal operation.

In the second form of construction each half of the filter comprises also three superposed filtering-chambers 3 4 5; but instead of these being connected with each other through central pipes they are connected through side pipes 24 and 25, provided with valves 31 32, and the last chamber is connected through a pipe 26 to the filtering-water-discharge pipe 10. The water arriving through the supply-pipe 8 is compelled to successively pass through the chambers 3 4 5 and is thus filtered three times. Besides, each chamber is provided with discharge-pipes connected through valves 17 18 19 to a main discharge-pipe 20, and, on the other hand, communicates with the filtered-water pipe through the pipes 26 27 28, the latter being provided with valves 29 30.

When one half of the filter has to be cleaned, the corresponding valves 23 31 32 are closed, and the valves 29, 30, 17, 18, and 19, located on the same side, are opened, so that the filtered water from the other half or from the supply-pipe 10 flows through the tubes 26 27 28 into the chambers 5 4 3 in a backward direction and goes upward through the filtering material and escapes, with all the impurities carried along, through the valves 17 18 19 and the pipe 20.

In Fig. 2 the arrows in the left half are giving the direction of the water-flow during the filtration, and the arrows in the right half are showing the direction of the water-flow during the cleaning.

It is to be understood that these arrangements have been given by way of an example and that the arrangement of the communication and of the valves so as to effect the filtering and cleaning as desired in one or several chambers of the filter may be varied in many ways. It is also understood that the number of the superposed chambers may be varied at will.

Having thus described my invention, what I claim is—

In a filter with supply-pipe at the top having a number of superposed filtering-compartments, separated by closed bottoms, the combination of revolving stirring-bars above the filtering stratas with fingers depending from said bars into the filtering material, of perforated sheets carrying the filtering strata, and secured above the separating-bottoms of the compartments, of overflow-pipes passing centrally through the perforated sheets and the separating-bottoms to connect a compartment with the adjacent compartment below, of valved outlet-pipes branching off from each compartment near the bottom and of valved outlet-pipes communicating with the compartments at a point above the top surface of the filtering layer, substantially as described and for the purpose set forth.

In testimony whereof I affix my signature.

HENRI DESRUMAUX.

In presence of—
PAUL FOLLIN,
RICHARD BAYER.